United States Patent
Emmerink et al.

(10) Patent No.: US 7,154,908 B1
(45) Date of Patent: Dec. 26, 2006

(54) METHOD AND ARRANGEMENT FOR COUPLING MESSAGES IN A CENTRAL CONTROL DEVICE WITH DECENTRALIZED COMMUNICATIONS DEVICES

(75) Inventors: Antonius Emmerink, Munich (DE); Egon Klein, Germering (DE); Andreas Steffan, Munich (DE); Rainer Windecker, Munich (DE); Steffi Winkler, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 970 days.

(21) Appl. No.: 10/088,688

(22) PCT Filed: Sep. 13, 2000

(86) PCT No.: PCT/DE00/03175

§ 371 (c)(1),
(2), (4) Date: Mar. 21, 2002

(87) PCT Pub. No.: WO01/22677

PCT Pub. Date: Mar. 29, 2001

(30) Foreign Application Priority Data

Sep. 21, 1999 (DE) ............................... 199 45 152

(51) Int. Cl.
*H04J 3/16* (2006.01)
*H04L 12/56* (2006.01)
*H04L 12/26* (2006.01)

(52) U.S. Cl. .................... 370/466; 370/395.2; 370/231; 370/232

(58) Field of Classification Search ................ 370/466, 370/395.2, 230–234
See application file for complete search history.

(56) References Cited

U.S. PATENT DOCUMENTS

| 5,912,885 | A  | * | 6/1999 | Mitts et al. ................. 370/331 |
| 5,953,337 | A  | * | 9/1999 | Almay ..................... 370/395.6 |
| 6,222,823 | B1 | * | 4/2001 | Smith et al. ................ 370/230 |
| 6,876,658 | B1 | * | 4/2005 | Epley ...................... 370/395.1 |

FOREIGN PATENT DOCUMENTS

| DE | 44 17 777 | 11/1995 |
| WO | WO 97/16007 | 5/1997 |

OTHER PUBLICATIONS

F. Allard "Broadband virtual private network signalling" Technol. J. 16(2):112-119, Apr. 1998.

* cited by examiner

*Primary Examiner*—Chi Pham
*Assistant Examiner*—Ronald Abelson
(74) *Attorney, Agent, or Firm*—Morrison & Foerster LLP

(57) ABSTRACT

The invention describes a novel private branch exchange and the migration solution with respect to existing devices. Communication connections are established via a transport network, the control takes place in a centralized manner by means of a central control device, which is connected to the decentralized switching devices and the interface modules via a two-stage connection, a collection and distribution of the control messages being carried out in a decentralized manner and the control connection from the respective decentralized device to the central control being provided by an ATM network or an Ethernet connection.

7 Claims, 5 Drawing Sheets

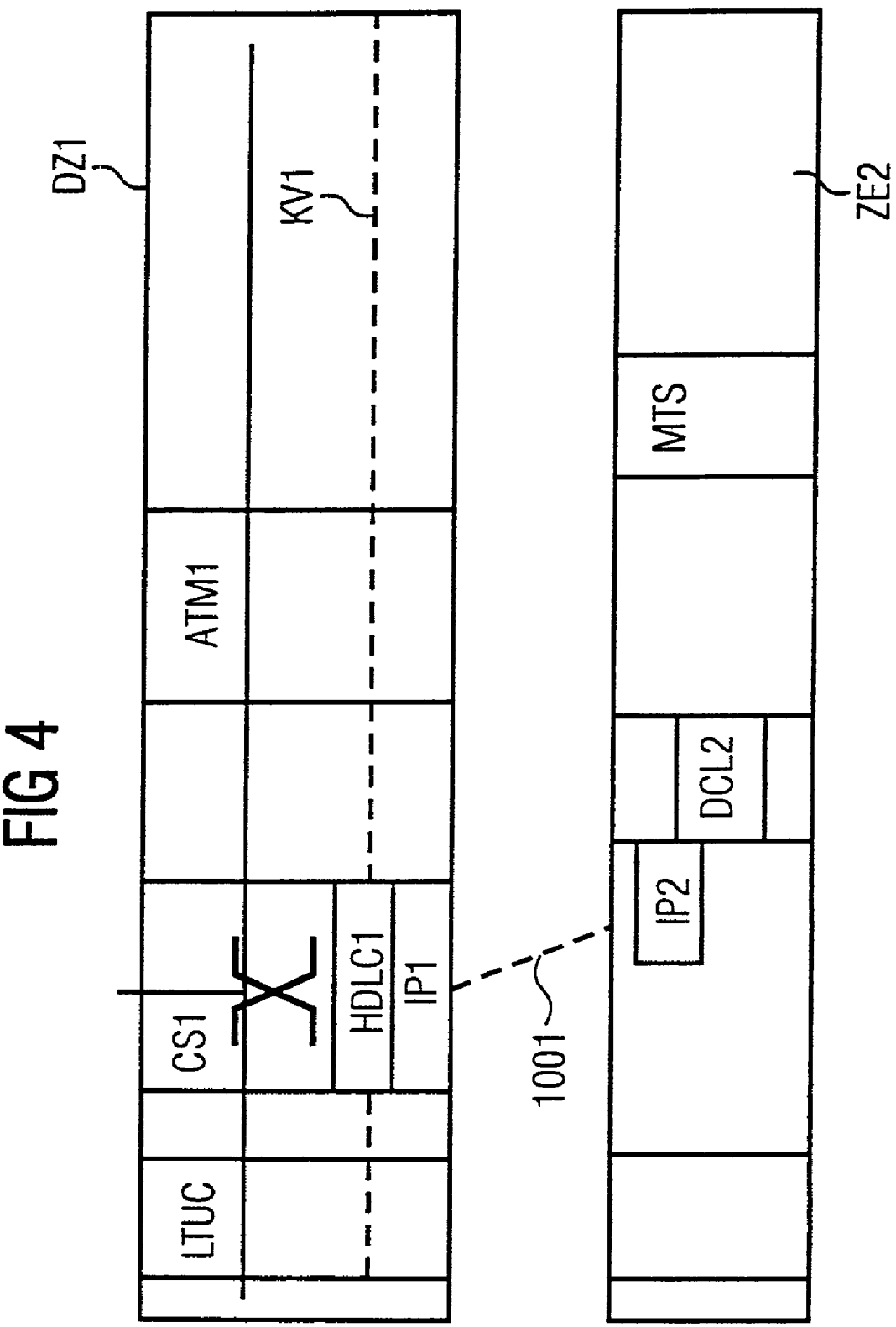

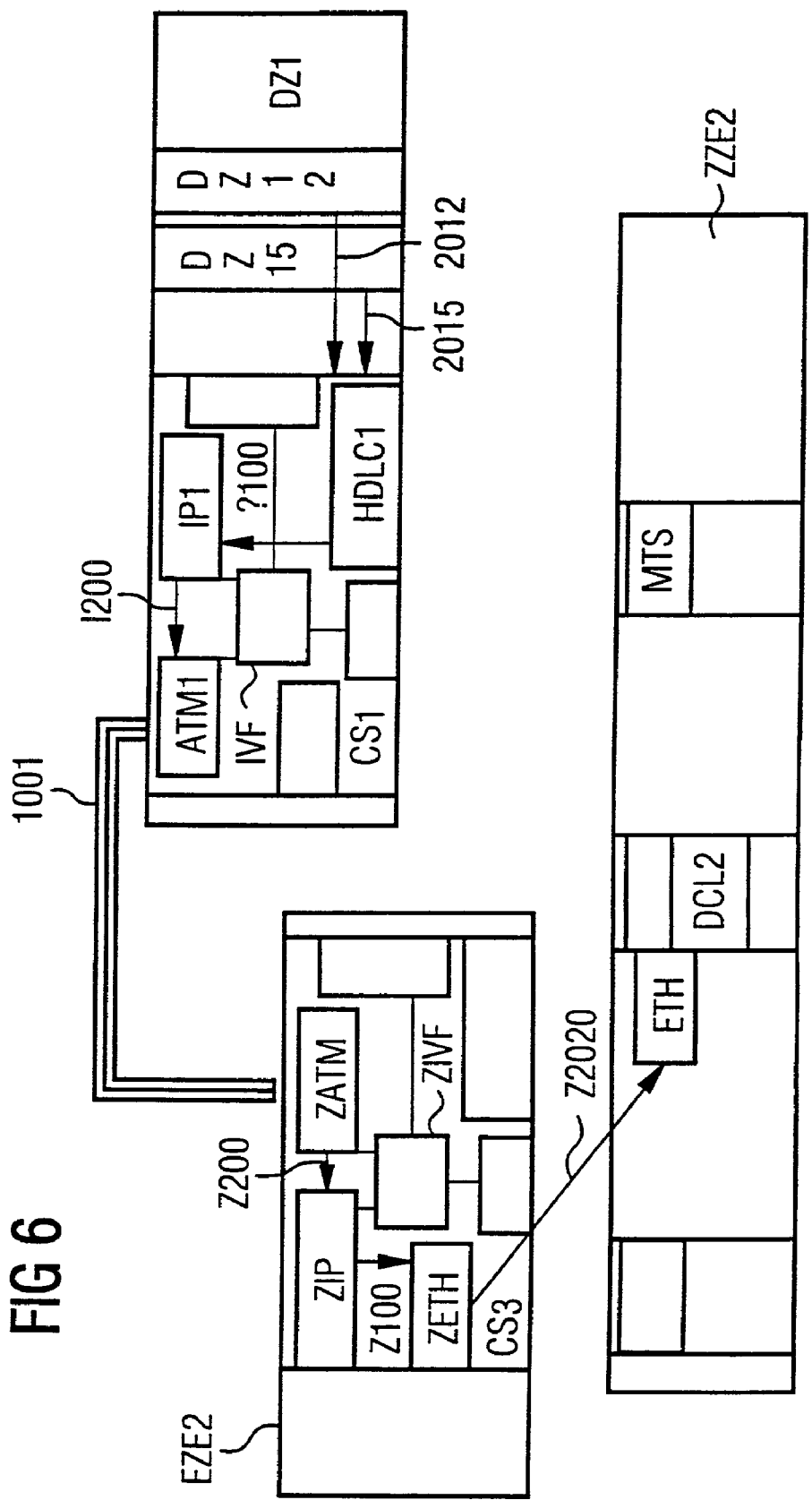

METHOD AND ARRANGEMENT FOR COUPLING MESSAGES IN A CENTRAL CONTROL DEVICE WITH DECENTRALIZED COMMUNICATIONS DEVICES

CLAIM FOR PRIORITY

This application claims priority to International Application No. PCT/DE00/03175 which was published in the German language on Sep. 13, 2000.

TECHNICAL FIELD OF THE INVENTION

The invention relates to a method and an arrangement for transporting messages, and in particular, to control messages, in a switching device such as a private branch exchange set up over a large area, in which a number of decentralized devices are controlled from a central device.

BACKGROUND OF THE INVENTION

The requirements imposed on communication infrastructure installations, such as private branch exchanges for example, are constantly increasing. The cause for the increasing requirements with regard to the data transmission capacity of switching devices lies in the constantly increasing demand for voice, video and data communication and the consequence that networks of broader bands have to be used for establishing connections. The cause for greater flexibility with regard to the number of subscribers which can be connected to switching devices lies in the requirement for the infrastructure to keep pace technically with the flexibility of the business processes of the users of the communication device. This results in a great demand for flexible modularly expandable private branch exchanges.

Current devices are based on time-slot multiplexing connections between communication terminals which are set up by means of a switching unit, for which purpose commands which indicate which defined time slot of an incoming connection is assigned to which defined time slot of an outgoing connection are generated by a control device. Such switching units are generally suitable for the establishment of a defined number of connections. The number of these connections is in this case dependent on the current demand of a private branch exchange. It is generally in the range of at most several thousand incoming and outgoing connections. Consequently, such devices are not particularly well suited for flexible adaptation to growing numbers of subscribers. Similarly, the data transmission capacity per time slot of a connection is restricted by the ISDN standard (Integrated Services Digital Network) to a maximum of 64 KB. This specified limit hinders, or prevents, a flexible subscriber-specific adaptation of different data rates for each connection.

Moreover, in the case of current devices, the setting-up of a communication infrastructure in the form of a network of decentralized devices which are supplied with messages by a central control is restricted because strict time requirements have to be satisfied when transporting control messages and, as from a defined length of the control line, it is no longer possible to comply with them. Used at present on these message lines is the HDLC protocol (Highlevel Data Link Control), with which messages are transmitted with the function, for example, of controlling the access of individual units in the decentralized devices to a PCM data stream (Puls Code Modulation), in that they prescribe defined time slots.

If HDLC connections were simply lengthened, the time requirements between the communication partners involved at the end of the link cannot be satisfied. The communication partners would have to be modified in such a way that they impose lower requirements on the time response. This is not practicable, since many possible communication partners are concerned and consequently great expenditure is incurred and the communication partners would have to be provided with more resources, for example memories.

FIG. 1 shows an example of a known private branch exchange 150 with a central control device. This private branch exchange is connected to two peripheral devices P1 and P2, to which there is respectively connected a communication terminal KE1 and KE2 operating on a digital or analog basis. These peripheral devices P1 and P2 are accommodated in the same spatial area as the first central device Z1. They are consequently located in the same space or in the same cabinet as it. The terminals occupy defined time slots of a PCM data stream (Puls Code Modulation) with communication data. In this case, these analog or digital communication terminals KE1 and KE2 are connected via interface modules SLMO1 and SLMO2, which feed to the PCM data stream, or remove from it, data which are intended for the respective terminals, or come from the respective terminals, via time slots established by control messages. Two PCM data streams are denoted in the figure by 100 and 200, respectively. Likewise represented are signaling connections 110 and 210, via which message traffic with a central control can take place. In the case of this representation it should be noted that a logical representation of the connections is shown in the topology for individual connections, and that this is not a physical representation. In the technical realization of these networks, the transport data and the messages can be transmitted over the same connection medium without restriction.

Also represented are peripheral devices P1 and P2, and also the supply modules LTUC1 and LTUC2, which regulate the data traffic to the interface modules, for example SLMO1 and SLMO2, of the respective peripheral devices. In this case, the peripheral device is fed control messages via the line 110 and the peripheral device P2 is fed control messages via the line 210. It can be clearly seen in the case of this known private branch exchange that, with this arrangement of the individual components of the switching device, both the information to be transported and the signaling information, exchanged by means of coordinated message traffic, have to be fed to a central device ZE1.

To be specific, messages 2, which are to be exchanged between the central device ZE2 and the peripheral devices P1, P2, are collected and distributed by a message device DCL. The setting-up and clearing-down of connections is controlled by means of the Call Processing CP, with the Call Processing using for this purpose, for example, device-specific interface functions DH, which are realized for example in the form of program modules. In particular, setting commands 1 for the switching unit MTS are generated. Such a setting command essentially controls which input of the switching unit is to be connected to which output in order to provide a communication connection via this switching device. In such a known communication arrangement, control and connection functions are consequently performed by a single spatially integrated functional unit of the communication network. In the case of such a center-oriented configuration, problems arise because the data to be transported have to be fed to the central device ZE1. This is the case even if, for example, two communication terminals which are connected to the same peripheral device P1 want to communicate with each other. Such a centrally oriented arrangement also gives rise to high expenditure on cabling, because both the control lines and the communication lines have to be routed to the central device ZE1. It is not possible for peripheral devices to be distributed over a wide area, because the time-critical message traffic via the control lines with the aid of a HDLC protocol cannot take place over links comprising lines of any desired length. To be able to achieve a greater area coverage by means of such devices, the coupling of a number of devices would be conceivable, although the advantages of a single system in the form of central interfaces, and for example central facility control, would be lost. Furthermore, when linking them up, additional trunk modules would have to be installed and additional connecting cables would have to be laid for their connection. Such private branch exchanges also cannot be modularly expanded to whatever extent is desired, because the switching unit MTS for example can only be provided as a complete unit. This means that, in an extreme case, a new switching unit with, for example, 4096 ports must be purchased and installed for a single additional connection. The transmission rate in such systems is limited for example by the possibility that only a maximum of 64 kbits, or some other administratively fixed or technically dictated volume of data which is prescribed by the ISDN standard, can be transmitted per time slot. In this case, different data rates for individual communication connections are not possible.

SUMMARY OF THE INVENTION

The invention is based on a method and an arrangement for coupling messages of a central control device with a decentralized communication device which are not subject to any restrictions with regard to the distance between the central device and the decentralized device.

In one embodiment of the invention, the time-critical message traffic is ensured in a particularly advantageous way by an especially suitable communication protocol on just one partial connection link. On a further partial connection, in particular a long-distance connection, another, specifically suitable, communication protocol can then be used. This advantageously achieves the effect that already existing modules in decentralized devices can continue to be used, without the length of the connecting lines to a central control device being subject to restrictions. Similarly, the message transport is advantageously optimized, because the messages are just transported directly and so there is no longer the additional computational effort which would arise when one protocol is packed into another protocol. Similarly, fewer data therefore have to be transmitted, whereby time advantages and higher data capacities in message transport are attainable.

Standardized communication protocols, set up in accordance with the OSI layer model (Open Systems Interconnect), are advantageously used, because standardized devices (chips, protocol stacks) for such protocols are available on the market, making it easily possible to meet the required increase in the transmission performance on a connection by using faster devices. Since the messages themselves are transmitted on each partial connection link, in an optimum way the volume of user data is transmitted and the data transmission structures can remain restricted to the necessary minimum.

In the case of a first protocol, the HDLC method is advantageously used on a lowermost layer level, because in this way the modules in the decentralized devices, which today already have an HDLC interface, can continue to be used. This HDLC method is advantageously combined with a second communication protocol, which on the lowermost layers either has an Ethernet protocol or transmits there in accordance with the ATM protocol. In this way it is possible to use networks that are established and available for long-distance transmission, it being possible as from layer 3 to use the same protocol layers again for the network switching and transport, in spite of the different fundamentals. For this reason, mixed configurations of a wide variety of protocols and networks can also be set up without any technical development effort. The ATM transmission method is advantageously particularly suitable for use on a long-distance connection, because different transmission qualities can be set up on the connections, allowing defined time requirements to be met in the message traffic.

In one aspect of the invention, the Internet protocol is advantageously used on the network layer, because this Internet protocol is already available for a wide variety of transmission media, and consequently the same transport and network switching services can be used for the various transmission media.

In another aspect of the invention, control messages are advantageously transmitted, because in this case there are hard time requirements of the communication partners, according to the method describes no changes are required in the decentralized devices, transmission methods for control messages already exist for the HDLC method, because they have already been implemented in the case of current devices, and because a wide variety of networks can be used for the long-distance connections.

One embodiment of the invention is advantageously suitable for the coupling of a number of decentralized devices to a central control, because messages are collected coordinated and distributed in a decentralized manner and have to be transmitted in a bundled manner on a line to the centre. In the bundling, a number of messages can be advantageously packed into an IP packet and consequently the administrative effort of the protocols can be reduced. The ratio of user data to protocol data is better as a result, and consequently there is a reduced load on the network.

For the administration of a number of decentralized devices, it is advantageously possible to set up groups, for which messages are respectively collected and distributed, because in this way message collecting and distributing devices which can already be used for central devices of a known type can be used in decentralized devices.

For the case in which a number of groups of decentralized devices are administered, a sorting of the messages is advantageously carried out in the central control device before they are processed, because in this way a unique group-specific prioritizing and processing of the messages is made possible.

At least two types of connecting lines, on which different transmission protocols are implemented, are used advantageously in an arrangement for coupling messages between a decentralized device and a central control device. For the exchange of messages in the local exchange area, HDLC-based protocols are advantageously used, because in this way already known and existing decentralized devices on the basis of the HDLC protocol with their critical time requirements in decentralized devices can continue to be used, and Internet connections or ATM connections, for which standardized products are established on the market, can be used for the long-distance connections of these decentralized devices to the central control device, so that, with regard to the transmission capacity, a broad spectrum can be easily covered by the acquisition of products generally available on the market.

Depending on the required transmission capacity and distance, various media, which are available for the most diverse networks, can be advantageously used for the long-distance connections. For this reason, in the case of a number of decentralized devices, mixed configurations comprising a wide variety of transmission media are also possible.

In another embodiment of the invention, first communication connections advantageously take the form of a backplane bus, because in this way already existing modules can be taken over unchanged from conventional devices into new devices as decentralized devices. Likewise, this type of configuration requires less additional development effort for the development of decentralized devices.

The protocol conversion takes place advantageously in the area of a decentralized device, because in this way the time-critical transmission in accordance with the HDLC method can be best ensured. Similarly, there is no need for additional devices which carry out a protocol conversion in the area of the private branch exchange. Moreover, converting devices arranged decentrally in this way are also able to be adapted exactly in their conversion capacity to the communication volume of the respective decentralized device, and consequently can be used particularly efficiently.

A special device, which sorts and distributes messages which are received by it from various second decentralized devices, or are to be sent to the latter, is provided advantageously in the central control device for the administration of second communication connections. In this way, a defined message processing over a number of decentralized devices is ensured and the possibility that messages over a number of decentralized devices can also be processed in a prioritizable manner is advantageously ensured.

For the case in which the second communication connection is formed as an ATM network, the central control device is advantageously divided into two units; of which one has an ATM access, while the other may be connected to this unit via a current Ethernet connection. This type of configuration has the advantage that customary central control devices can continue to be used largely unchanged and do not have to be further developed for access to an ATM network. Furthermore, the ATM network can be used for the transmission both of control messages and for the transport of communication data between the terminals, only the Internet protocol having to be implemented on layer 3 of the communication protocol for the transmission of the control messages, and the transfer to the central control device to the Ethernet can also take place on this layer. It is consequently possible to dispense with Ethernet connections between the central control device and the decentralized communication devices. It should be noted here that the network topology for the transport of communication data may well differ from the network topology for the exchange of messages. The user of the communication system has the advantage that he only has to have an ATM network connection, and not also an Ethernet connection.

The message processing takes place advantageously in the second central device, because in this way previously customary peripheral devices can also be involved in the message control sequence, so that a mixture of previously customary devices of a private branch exchange with novel devices of a new private branch exchange can be operated and controlled in any desired form. In another embodiment of the invention, control messages for the connection control of a switching unit are generated advantageously in the central control device and transmitted to the second decentralized communication devices, or are used for controlling the switching unit in the case of mixed arrangements. In this way, connections can be established in the entire area of the switching device, irrespective of whether the communication subscribers are connected to novel devices or to customary devices.

BRIEF DESCRIPTION OF THE INVENTION

Exemplary embodiments of the invention are explained in more detail below on the basis of figures:

FIG. 4 illustrates the linking of a decentralized device to a central device.

FIG. 6 shows a view of a detail of the coupling of decentralized devices to a central control device via an ATM network.

DETAILED DESCRIPTION OF THE PREFERRED EMBODIMENTS

Figure 1:
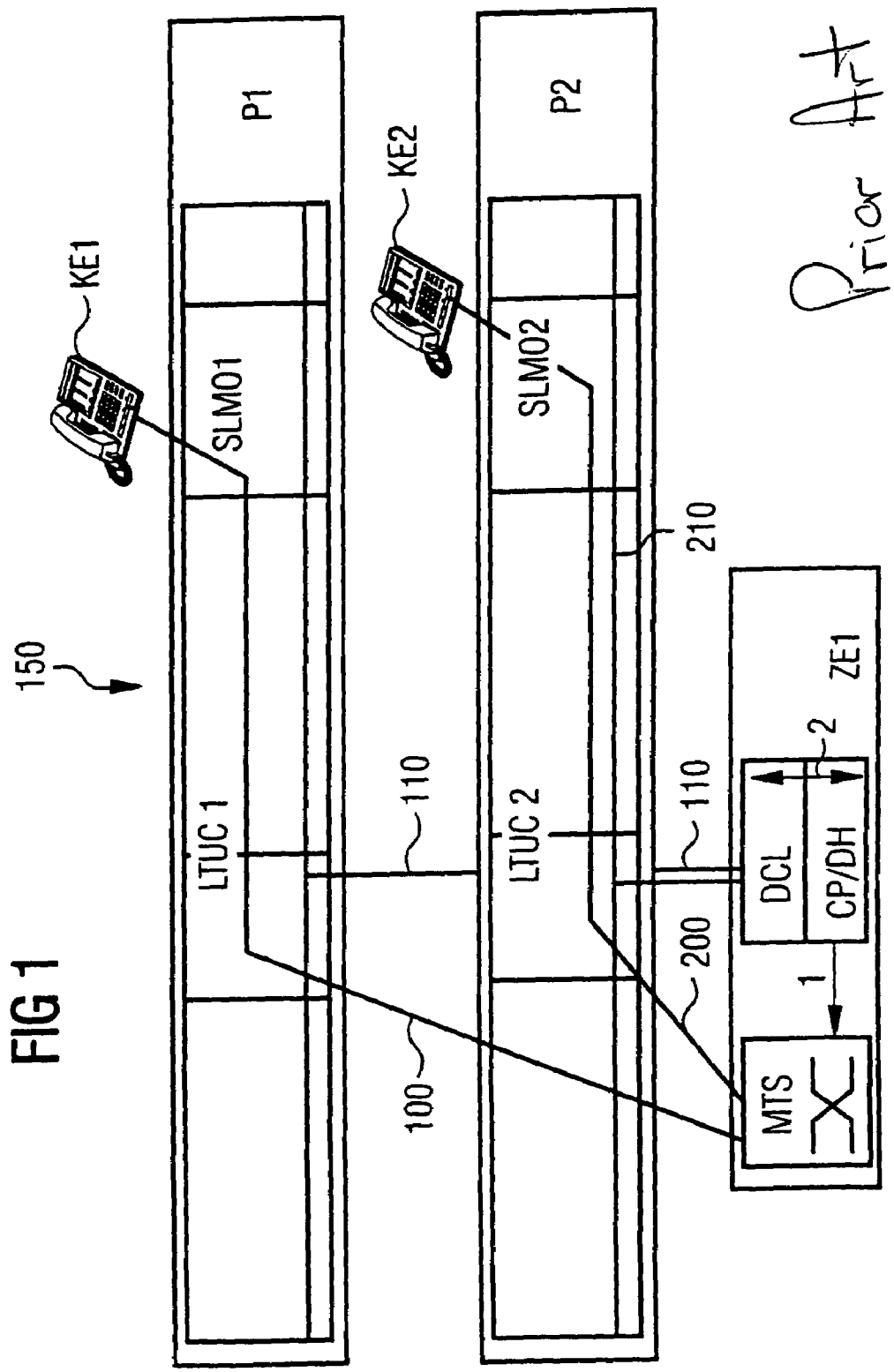
FIG. 1 shows a conventional communication arrangement.
Figure 2:
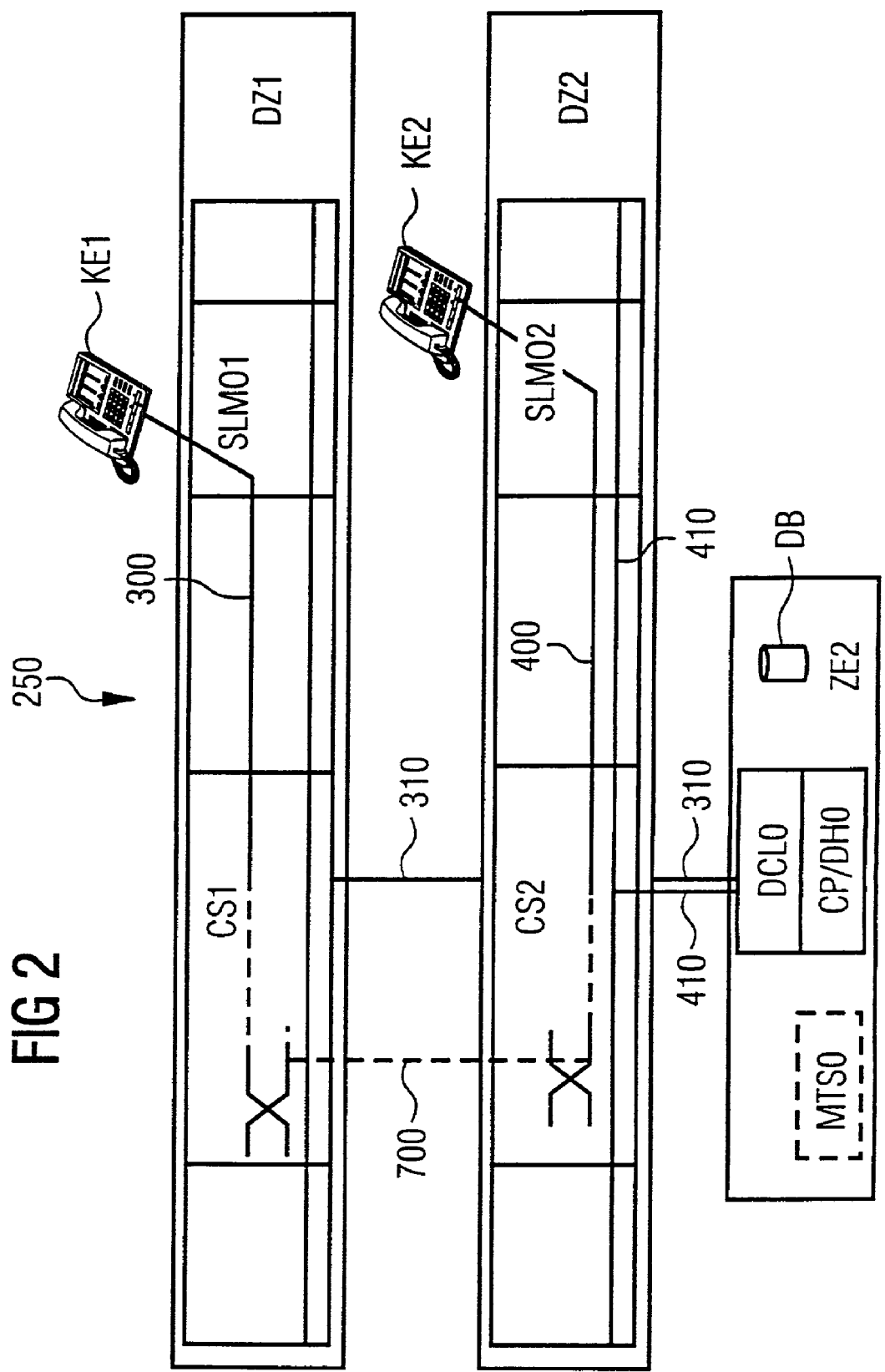
FIG. 2 shows an example of a communication arrangement with decentralized devices.

FIG. 2 shows an example of an arrangement for setting up, clearing down and operating communication connections via decentralized devices which are controlled by a central device. Here, for example, a private branch exchange 250 is represented. The same component parts of the device are denoted by the same reference numerals in FIG. 2 as in FIG. 1. It is notable in the case of this communication arrangement that there are a separate transport network 700 and an independent control network 310/410. Such a setup of an exchange has the advantage that already existing networks, in the form of public or private networks, can be used for the transport network. What is more, the control network has to be routed to the central device ZE2.

The digital or analog communication terminals KE1 and KE2 are represented in this representation in such a way that they are respectively connected to interface modules SLMO1 and SLMO2. Without restricting the invention, however, such terminals which can be connected to the transport network 700 directly, bypassing the interface modules SLMO, are also conceivable and able to be integrated in such an arrangement 250. Consequently, ATM terminals or IP-based (Internet Protocol) terminals can also be directly connected.

As can also be seen, the decentralized devices DZ1 and DZ2 in each case have decentralized switching devices CS1 and CS2, which may for example take the form of ATM access devices. Similarly, it can be directly seen that the switching unit MTS0 is no longer used for connection tasks. These connection tasks are instead undertaken by the transport network.

For controlling the decentralized switching devices CS1 and CS2, at least one item of control information is in each case transmitted by means of a dedicated message to these switching devices via the control lines 410 and 310, which are component parts of a control network, for setting up and clearing down the communication connection. This control information includes time-slot-related control information, derived from the control instructions for the switching unit MTS. Furthermore, the figure reveals that a conversion from PCM data into ATM cell data is carried out on a data link 300 or 400. It should be noted here that the use of an ATM network as a transport network serves here merely as an exemplary embodiment. Internet and other IP connections, or even TDM connections, likewise come into consideration as transport networks. The selection of the respective network is in this case dependent on the intended use and extends over the entire spectrum of available networks, both in the narrowband range and in the broadband range.

Because the communication connections to the central device ZE2 are no longer needed in such arrangements, in the case of this configuration it is not necessary for connection fees, for instance for both connections from DZ1 and DZ2 to the central device ZE2 via public lines, for example fixed lines, to be paid, as previously the case with a remote peripheral device PE in a device 150 from FIG. 1 when there is communication from PE1 to PE2. For controlling the setting-up of the connection and the associated exchange of messages, a transport-network-dependent call processing is carried out on the decentralized switching devices CS1 and CS2, but is restricted essentially to basic call functionality. The facilities are in this case realized and provided by the central control ZE2. Connections between the various central devices are controlled by the central devices ZE2 by means of messages which contain control information.

The advantages of such an arrangement are that it is capable of both narrowband and broadband operation. A possibly used backplane in the decentralized device would have to be newly developed, however, in order to allow broadband connections to be established, in contrast to TDM backplanes. Furthermore, the transport network can be set up both on public networks and on private networks, or else on a mixture of the two. Furthermore, there is the possibility of assigning to the central device ZE2 decentralized devices that are an unlimited distance away, so that even very large installations can be provided with such a private branch exchange, which in turn serve for supplying widespread areas with communication connections. In this case, because a central device is retained, there is the possibility of continuing to use already existing software, with minimal changes, for the control. On the other hand, new methods of control would have to be developed and a new mechanism for ensuring consistency of a distributed database would have to be created if the control, like the switching unit, were likewise distributed. A further advantage of such a device 250 in comparison with networked systems of the type 150 is that the distributed system behaves like a single telephone switching device and therefore facilities which are merely implemented across the exchange can be operated there. This dispenses with the need to convert individual facilities to make them able to operate on a network. For this reason, central interfaces and applications can likewise continue to be used.

Figure 3:
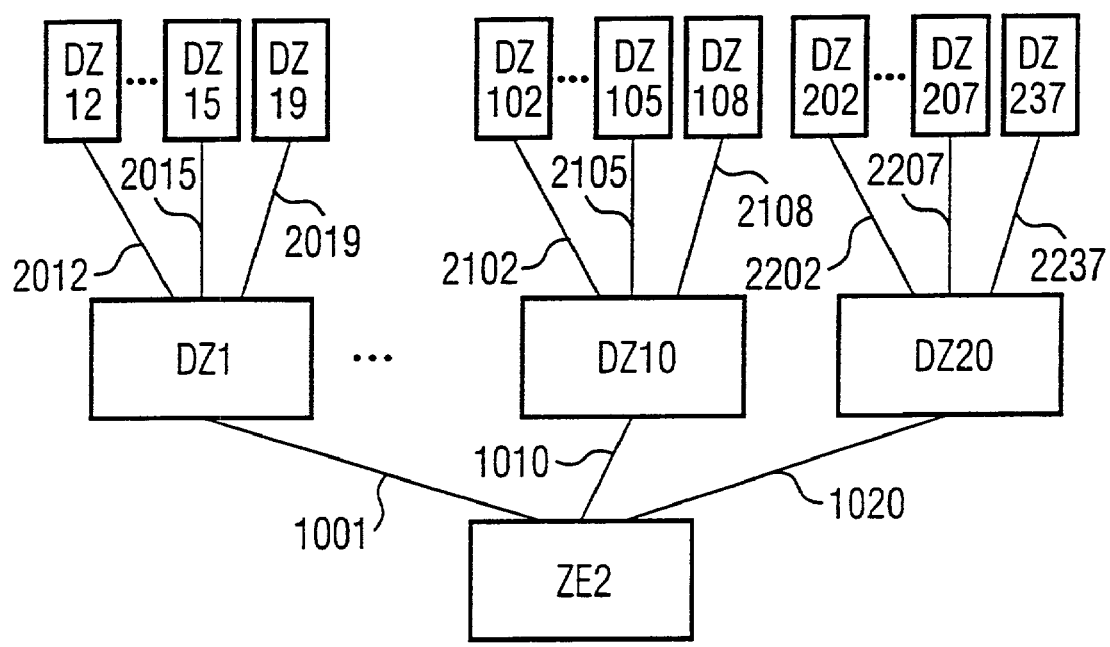
FIG. 3 shows a network structure comprising a central device and a number of decentralized devices.

FIG. 3 shows by an example, in a schematized form, the setup of a private branch exchange 450. There can be seen a central control device ZE2, which is in connection with second decentralized communication devices DZ1, DZ10 and DZ20 via second communication connections 1001, 1010 and 1020. These connections are generally long-distance connections, with which the less time-critical coupling of various first decentralized communication devices can be accomplished. It is indicated by the dots between DZ1 and DZ10 in the figure that any number of decentralized devices DZ can be connected via second communication connections to the central device. Examples of such networks for long-distance connection which may be given are ATM networks, Ethernets, or other IP-transporting networks. Assigned to each second decentralized device are first decentralized devices. These second decentralized devices are in contact with the first decentralized devices via a first communication connection. The message traffic from the first decentralized device to the second decentralized device is handled via this communication connection, which at the same time serves as a relay station for the communication with the central control device ZE2.

Connected to the second decentralized device DZ1 are first decentralized devices DZ12, DZ15 and DZ19, each via first communication connections 2012, 2015 and 2019. The dots between the first decentralized devices DZ12 and DZ15 are intended to indicate that it is possible within the limits of the technical possibilities of a second decentralized device for any number of such first decentralized devices to be connected to the latter via respective first communication connections. Furthermore, connected to the second decentralized device DZ10 are first decentralized devices DZ102, ZD105 and DZ108 via first communication connections 2102, 2105 and 2108. The functionality of the second decentralized devices for the message traffic is essentially identical. For the exchange of messages with the central control device ZE2, first decentralized devices DZ202, DZ207 and DZ237 are connected to the second decentralized device DZ20 via first communication connections 2202, 22207 and 2237. In a favorable configuration of an arrangement, the first decentralized devices DZ12 to DZ 237 are configured as interface modules for communication terminals SLMO. The first communication connections 2012 to 2237 to the respective first decentralized devices are generally connections via which time-critical control messages are transmitted. For this purpose, the HDLC method is used between the first decentralized device and the second decentralized device as the first communication protocol. These first communication connections may advantageously take the form of a backplane bus of a second decentralized device. This variant of the configuration allows modules which are used in conventional systems 150 for the connection of communication terminals to be used as first decentralized devices.

The second decentralized communication devices are connected over relatively great distances, via LANs (Local Area Networks) or WANs (Wide Area Networks) such as Ethernet or ATM connections for example, to the central control device ZE2. On these second communication connections, a layer protocol of the ISO type (Open Systems Interconnect) of protocol is implemented, comprising seven layers, the lowermost layer representing the physical layer, the second layer the link layer, the third the network layer, the fourth the transport layer, the fifth the session control, the sixth the data presentation and the seventh the application layer. In this layer protocol, standardized in accordance with ISO IS8802, each layer uses the services of the layer lying under it. Messages which are transmitted with the aid of this layer protocol consequently receive additional information successively at each layer, thus producing a data structure in which the original message has seven layer-specific elements of information added to it. This process is also known as "packing" the information, whereas the reverse process, in which the corresponding elements of the structure are returned layer-dependently to the respective layers to produce the original message, is known as "unpacking". Theoretically, the possibility of interleaving a number of such protocols would also exist, but would necessitate a considerable administrative effort and would lead to increased loading of the second communication connection during the data transmission, because the information on the layer organization of the other protocol has to be additionally transmitted along with the actual message itself.

For converting the HDLC protocol used on the first communication connection into the OSI protocol layers used on the second communication connection, for example in the form of the layer sequences Ethernet/IP/TCP or ATM/IP/TCP, there is in a respective second decentralized device DZ1 to DZ20 in each case a device for protocol transformation of the messages to be exchanged, this device in each case performing the conversion by unpacking the message completely from the protocol used and then packing it into the other protocol and passing it on. As the figure further reveals, various first decentralized devices and second decentralized devices form groups. These groups are devices which are spatially close together and may, for example, be accommodated in different buildings, which are connected to one another by a private branch exchange. For administering the message traffic from the first decentralized devices to the central control device, in the second decentralized device there is provided a message collecting and distributing device, which acts virtually as a representative communication partner of the first decentralized devices and coordinates the message traffic between the central control device and the first decentralized devices.

Previously customary peripheral devices are also linked to ZE2 via a device DCL (not represented). An additional software module decides whether messages are sent as before via DCL or via the IP path and consequently via the Ethernet connection. In the opposite direction, this software similarly forms both inputs (DCL and IP) in one. Consequently, the additional software module provides a uniform interface in the direction of the system software and covers the split into two different paths and types of transmission.

In connection with the reference numerals which are used in the various figures, it must also be noted that the same reference numerals also concern communication devices or component parts of communication arrangements of the same type. The second communication connections to the central control device may be configured on a wide variety of communication media, it being possible for the Internet protocol to be used on layer 3 and the Transmission Control Protocol TCP to be used on layer 4. Various mixed variants are conceivable here. This protocol structure achieves the effect that, as from layer 3, messages can be exchanged over a wide variety of communication media system-wide.

FIG. 4 shows a view of a detail of the private branch exchange 450 which is represented in FIG. 3. To illustrate individual elements of the second decentralized device DZ1 and of the central control device ZE2. As can be seen, a first communication connection KV1 is configured for example as a backplane bus of a second decentralized device DZ1, the first communication connections 2012 to 2019 run there. In a decentralized switching device CS1 there is provided a conversion device HDLC1, IP1, which converts the HDLC protocol used on the first communication connection KV1 into the OSI layer protocols used on the second communication connection 1001, and vice versa. The decentralized switching device CS1 has a port 700 to the transport network. For the coordination of the message traffic between the first decentralized devices and the central control device there is in the second decentralized device DZ1 a message collecting and distributing device HDLC1. There, messages from first decentralized devices are collected and passed on in a bundled form via the second communication connection 1001 to the central control device ZE2. In the reverse direction, the control messages arriving from the central control device are distributed to the respective addressees in the second decentralized device. To be able to evaluate and process in a coordinated manner the various messages which are sent to the different second decentralized communication devices, or which are sent in the opposite direction from the various second decentralized communication devices to the central control device ZE2, there is in the central control device a connection device IP2, which is capable of evaluating the protocol information on the second communication connection 1001 and recreating the original messages, or packing them in the reverse direction. The connection devices IP1 and IP2 may in this case operate on the lowermost layers with the Ethernet protocol. This connection device is in connection with a message processing and control device DCL2, which in the case of the central control device ZE2 possibly prioritizes, sorts, passes on for processing or sends messages also arriving from peripheral devices via DCL, or sent from it.

As can be further seen, in the arrangement represented the switching unit MTS no longer performs any function. However, it is conceivable that a peripheral device, which is represented in FIG. 1, is connected to ZE2 via a decentralized switching device of the same type as CS1, the message traffic with ZE2 continuing to be handled by means of HDLC via DCL and DCL2. In this way, conventional, already operating private branch exchanges can be combined with exchanges of a newer type and this type of arrangement is appropriate as a migration solution for a transitional period of time. For the case in which older devices of the type of a switching device 150 are connected, the switching unit MTS is still required in order to perform the connecting function in the area of devices of the type 150. DCL2, as an additional software module, brings the two message paths via DCL and IP2 together and thus covers the existence of two interfaces for the central control ZE2.

Figure 5:
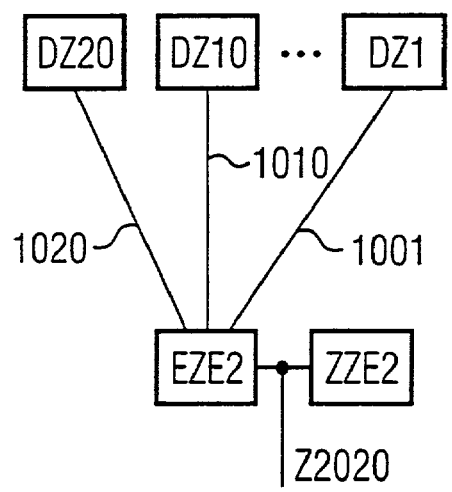
FIG. 5 illustrates an advantageous configuration of an arrangement for coupling messages on the basis of an ATM network.

FIG. 5 shows a special embodiment of a private branch exchange 450, in which an ATM network is used as the second communication connection between the central control device. In the case of this special configuration of the arrangement, the same ATM network can be used for the transport network 700 and for the accomplishment of the message traffic via second communication connections by means of the IP protocol. In this case, the transport network 700 and the control network which is formed by the second communication connections 1020 to 1001 may have a complete different logical structure.

This special embodiment is particularly favorable because it is possible in this case to dispense with Ethernet connections to the second decentralized devices DZ20 to DZ1 and only a single network infrastructure has to be provided, for example in the form of an ATM network. However, this type of physical coupling for the accomplishment of the message traffic requires adaptation measures in the area of the central control device ZE2. For this purpose, the central control device ZE2 is divided into two subunits EZE2 and ZZE2, which are connected to each other by a connecting line Z2020. In this case, the connection to the ATM network is established via the first central unit EZE2, while the message collection evaluation, processing and distribution takes place in the second central device ZZE2. More details on this emerge from the description of FIG. 6.

FIG. 6 shows a partial view of the private branch exchange 450 which is represented in FIG. 5. Here, the individual components of the decentralized device DZ1 and of the first central unit EZE2 and of the second central unit ZZE2 can be seen. Realized in the second decentralized device DZ1, for example by means of a backplane bus, are first communication connections 2015 and 2012, via which a communication of the first decentralized communication devices DZ15 and DZ12 with a device HDLC1 takes place in accordance with the HDLC protocol.

For example, communication terminals are connected to these first decentralized devices. The device HDLC1 serves as a message collecting and distributing device, which terminates the HDLC protocol in the direction of the communication terminals. The messages are passed to the device IP1, which serves for packing the messages into the Internet protocol. HDLC1 and IP1 consequently form the converting device from HDLC to IP. The IP packets are fed to an ATM access device ATM1 and converted there into an ATM cell stream.

The conversion of the data which are transmitted in accordance with the Internet protocol into an ATM cell stream for the device ATM1 may take place either in IPM1 or in ATM1. The data connections I100 and I200 represented are not necessarily lines in the physical sense but functional block interfaces, which may also be formed as software interfaces, for a transfer in the memory for example.

Also represented is an internal connection function IVF, which allows connected terminals access to the transport network 700. These devices are a component part of a decentralized switching device CS1. The message traffic takes place via a second communication connection 1001, which is formed here as an ATM connection. In the first central unit EZE2 there are the same components for a decentralized switching device CS3 as in the case of CS1, although they are marked with the prefix "Z" for differentiation, and they perform the same functions as the components of the same type in the case of CS1. Here, however, a protocol conversion of the Internet protocol via the ATM network to the Internet protocol on the Ethernet takes place. This happens in ZIP or in ZETH. Information between these components is exchanged via an internal connecting line Z100. The Ethernet interface module is linked to the second central unit ZZE2 via the second communication connection 2020 to an Ethernet access module ETH. By such an arrangement, the ATM access is decoupled from the central control device ZE2. In this way, a second central unit ZZE2 can be constructed in a way essentially similar to a device ZE2, which was described in FIG. 2. It is consequently not necessary to carry out elaborate changes in an existing system to enable it to communicate in accordance with the Internet protocol on an ATM network. This property is provided by the first central unit EZE2. While in the case of known devices the polling of the first decentralized device DZ15 and DZ12 was carried out from the second central unit ZZE2, this now takes place from a representative module HDLC1 in the second decentralized device DZ1.

What is claimed is:

1. A method for coupling messages of a central control device with decentralized communication devices, comprising:
    setting up and/or clearing down a communication connection for the transport of communication data which is performed by at least one first functional unit of a communication network;
    controlling the connection function which is performed by a second functional unit of the communication network, wherein
    the first and second functional units are spatially separate from each other,
    message traffic occurs on at least two partial connection links;
    different communication protocols are used on the partial connection links; and
    a message is transmitted on the partial connection link directly using a respective communication protocol,
    in which groups of a number of first decentralized devices and second decentralized devices are administered,
    in which messages occur from a number of first decentralized devices, the messages are transmitted after passing through a first partial connection link in a second decentralized device in a bundled form and on one second partial connection link, and
    in which the messages from/to the second decentralized devices are initially sorted and then processed in the central control device.

2. A system for coupling messages of a central control device with decentralized communication devices, comprising:
    a transport network for providing a communication connection;
    a control network for controlling the setting-up and/or clearing-down of the communication connection;
    a device to control the setting-up and/or clearing-down of a connection in the transport network by a control network, the device being spatially separate from the transport network;
    at least one first decentralized communication device to receive and/or issuing a message;
    at least one second decentralized communication device to collect and/or distributing messages;
    a central control device to issue and receive messages;
    at least one first communication connection between the first and second communication devices; and
    a second communication connection between the second decentralized communication device and the central control device, the second communication connection being formed as an Internet or ATM network, and the first communication connection being formed as an HDLC-based connection, in which the first communication connection is formed as a bus on a backplane.

3. The system as claimed in claim 2, in which the second communication connection is formed as a coaxial cable or as an optical waveguide.

4. A system for coupling messages of a central control device with decentralized communication devices, comprising:
    a transport network for providing a communication connection;
    a control network for controlling the setting-up and/or clearing-down of the communication connection;
    a device to control the setting-up and/or clearing-down of a connection in the transport network by a control network, the device being spatially separate from the transport network;
    at least one first decentralized communication device to receive and/or issuing a message;
    at least one second decentralized communication device to collect and/or distributing messages;
    a central control device to issue and receive messages;
    at least one first communication connection between the first and second communication devices; and
    a second communication connection between the second decentralized communication device and the central control device, the second communication connection being formed as an Internet or ATM network, and the first communication connection being formed as an HDLC-based connection, in which, for the case in which a number of second communication devices are connected via a number of second communication connections to the central control device, at least one device coordinates the messages, which sorts the messages arriving on the second communication connection, which is connected to a device to process the messages.

5. A system for coupling messages of a central control device with decentralized communication devices, comprising:
　a transport network for providing a communication connection;
　a control network for controlling the setting-up and/or clearing-down of the communication connection;
　a device to control the setting-up and/or clearing-down of a connection in the transport network by a control network, the device being spatially separate from the transport network;
　at least one first decentralized communication device to receive and/or issuing a message;
　at least one second decentralized communication device to collect and/or distributing messages;
　a central control device to issue and receive messages;
　at least one first communication connection between the first and second communication devices; and
　a second communication connection between the second decentralized communication device and the central control device, the second communication connection being formed as an Internet or ATM network, and the first communication connection being formed as an HDLC-based connection, in which the second communication connection is formed as an ATM network, the central control device has a first and a second central device, a converting device is present in the first central device, for the conversion between protocol layers of the Internet protocol via the ATM network to protocol layers of the Internet protocol via the Ethernet, and the first and second central devices are in connection with each other via an Ethernet connection.

6. A system for coupling messages of a central control device with decentralized communication devices, comprising:
　a transport network for providing a communication connection;
　a control network for controlling the setting-up and/or clearing-down of the communication connection;
　a device to control the setting-up and/or clearing-down of a connection in the transport network by a control network, the device being spatially separate from the transport network;
　at least one first decentralized communication device to receive and/or issuing a message;
　at least one second decentralized communication device to collect and/or distributing messages;
　a central control device to issue and receive messages;
　at least one first communication connection between the first and second communication devices; and
　a second communication connection between the second decentralized communication device and the central control device, the second communication connection being formed as an Internet or ATM network, and the first communication connection being formed as an HDLC-based connection, in which the second communication connection is formed as an ATM network, the central control device has a first and a second central device, a converting device is present in the first central device, for the conversion between protocol layers of the Internet protocol via the ATM network to protocol layers of the Internet protocol via the Ethernet, and the first and second central devices are in connection with each other via an Ethernet connection, and
　in which the second central device has the device for processing messages.

7. The system as claimed in claim 5, A system for coupling messages of a central control device with decentralized communication devices, comprising:
　a transport network for providing a communication connection;
　a control network for controlling the setting-up and/or clearing-down of the communication connection;
　a device to control the setting-up and/or clearing-down of a connection in the transport network by a control network, the device being spatially separate from the transport network;
　at least one first decentralized communication device to receive and/or issuing a message;
　at least one second decentralized communication device to collect and/or distributing messages;
　a central control device to issue and receive messages;
　at least one first communication connection between the first and second communication devices; and
　a second communication connection between the second decentralized communication device and the central control device, the second communication connection being formed as an Internet or ATM network, and the first communication connection being formed as an HDLC-based connection, in which the second communication connection is formed as an ATM network, the central control device has a first and a second central device, a converting device is present in the first central device, for the conversion between protocol layers of the Internet protocol via the ATM network to protocol layers of the Internet protocol via the Ethernet, and the first and second central devices are in connection with each other via an Ethernet connection, and
　in which the central control has a device to control a switching unit for the creation of time-slot multiplex connections, and the device is in operative connection with the device to process messages.

* * * * *